US007313737B2

(12) United States Patent
Gronberg et al.

(10) Patent No.: US 7,313,737 B2
(45) Date of Patent: Dec. 25, 2007

(54) ADAPTIVE LINK ADAPTATION

(75) Inventors: Petri Gronberg, Nokia (FI); Ville Vuorinen, Helsinki (FI)

(73) Assignee: Nokia Corporation, Espoo (FI)

( * ) Notice: Subject to any disclaimer, the term of this patent is extended or adjusted under 35 U.S.C. 154(b) by 534 days.

(21) Appl. No.: 10/434,476

(22) Filed: May 9, 2003

(65) Prior Publication Data
US 2004/0184482 A1 Sep. 23, 2004

Related U.S. Application Data

(60) Provisional application No. 60/455,581, filed on Mar. 19, 2003.

(51) Int. Cl.
*G06F 11/08* (2006.01)
*G06F 11/27* (2006.01)
(52) U.S. Cl. ...................... 714/704; 714/776
(58) Field of Classification Search ............ 714/704, 714/776, 748; 455/522; 370/473, 395.21, 370/469, 312
See application file for complete search history.

(56) References Cited

U.S. PATENT DOCUMENTS

| 6,122,293 | A * | 9/2000 | Frodigh et al. ............ 370/473 |
|---|---|---|---|
| 6,529,525 | B1 * | 3/2003 | Pecen et al. .............. 370/469 |
| 6,532,562 | B1 * | 3/2003 | Chou et al. ............... 714/776 |
| 6,557,135 | B1 * | 4/2003 | Balachandran et al. ..... 714/748 |
| 6,816,464 | B1 * | 11/2004 | Scott et al. ............... 370/252 |
| 6,853,627 | B1 * | 2/2005 | Evans ...................... 370/312 |
| 2002/0126675 | A1 * | 9/2002 | Yoshimura et al. ..... 370/395.21 |
| 2003/0109274 | A1 * | 6/2003 | Budka et al. .............. 455/522 |

FOREIGN PATENT DOCUMENTS

| EP | 1 109 343 A2 | 6/2001 |
|---|---|---|
| EP | 1 255 368 A1 | 11/2002 |

OTHER PUBLICATIONS

European Search Report dated Aug. 21, 2006.

* cited by examiner

*Primary Examiner*—Cynthia Britt
*Assistant Examiner*—Dipakkumar Gandhi
(74) *Attorney, Agent, or Firm*—Squire, Sanders & Dempsey, L.L.P.

(57) ABSTRACT

The invention concerns an adaptive link adaptation method and system for a packet data enabled mobile telecommunication network. Data packets are transferred over one or more radio links, each packet is coded using a given coding scheme. Statistical data including channel quality estimates, information about successfully or unsuccessfully received data packets, and information about the used coding schemes are accumulated. Block error rates for one or more coding schemes are determined based on the accumulated statistical data, each block error rate including a function of coding scheme and channel quality estimate. A coding scheme with the best performance for a current data packet to be transmitted over a given radio link with current channel quality is selected based on the determined block error rates.

32 Claims, 3 Drawing Sheets

Table 2: Unsuccessfully received packets:

| | CS1 | CS2 | CS3 | CS4 |
|---|---|---|---|---|
| CQ1 | 0 | 4 | 1 | 0 |
| CQ2 | 1 | 8 | 7 | 1 |
| CQ3 | 0 | 2 | 1 | 4 |
| CQ4 | 6 | 1 | 0 | 1 |
| CQ5 | 1 | 0 | 3 | 1 |
| CQ6 | 0 | 4 | 2 | 0 |
| CQ7 | 3 | 0 | 1 | 1 |
| CQ8 | 3 | 5 | 1 | 0 |

Table 1: Successfully received packets:

| | CS1 | CS2 | CS3 | CS4 |
|---|---|---|---|---|
| CQ1 | 1 | 5 | 9 | 22 |
| CQ2 | 16 | 1 | 4 | 3 |
| CQ3 | 1 | 21 | 8 | 6 |
| CQ4 | 14 | 2 | 0 | 1 |
| CQ5 | 1 | 7 | 1 | 3 |
| CQ6 | 9 | 0 | 25 | 1 |
| CQ7 | 2 | 15 | 1 | 33 |
| CQ8 | 0 | 1 | 24 | 8 |

Fig. 3

ADAPTIVE LINK ADAPTATION

CROSS-REFERENCE TO RELATED APPLICATIONS

This application claims priority of U.S. Provisional Application Ser. No. 60/455,581 entitled, "Adaptive Link Adaptation," filed Mar. 19, 2003, the entire contents of which are incorporated herein by reference.

BACKGROUND OF THE INVENTION

1. Field of the Invention

The invention relates to telecommunications. In particular, the invention relates to a novel and improved adaptive link adaptation method and system for a packet data enabled mobile telecommunication network.

2. Description of the Related Art

Recently mobile telecommunication networks have started to provide packet data services for subscribers in addition to traditional circuit switched services. A circuit switched service refers to a type of service for which a physical path is dedicated to a single connection between two end-points in the network for the duration of the connection. For example ordinary voice phone service is circuit-switched. Packet switched data service refers to a type of service in which relatively small units of data called packets are routed through a network based on the destination address contained within each packet. In the following the terms packet switched data and packet data are used interchangeably unless otherwise noted.

An example of packet data service for mobile telecommunication networks is General Packet Radio Service (GPRS). GPRS is designed to support especially digital mobile telecommunication networks based on the GSM (Global System for Mobile Communications) standard. However, GPRS is not restricted to only GSM networks but may support for example 3GPP (Third Generation Partnership Project) system based digital mobile telecommunication networks. A recent enhanced version of GPRS is referred to as EGPRS (EDGE General Packet Radio Service, where EDGE stands for Enhanced Data rates for GSM Evolution).

A GPRS enabled mobile telecommunication network includes two additional network elements or nodes. These are a Serving GPRS Support Node (SGSN) and a Gateway GPRS Support Node (GGSN). Additionally GPRS requires some modifications to existing network elements. A Packet Control Unit (PCU) is typically implemented in connection with a base station or base station controller. The Packet Control Unit controls functionalities associated with packet switched data transfer. Further, mobile terminals need to support packet switched data transfer.

Radio links connecting a PCU to mobile terminals are one of the most critical parts of GPRS and EGPRS enabled mobile telecommunication networks. For example, radio signal disturbance due to fast-fading, shadowing, noise and co-channel interference may result in data packets being lost and thus needing to be re-transmitted. Thus, various coding schemes are used to avoid transmission errors.

When a data packet is coded, some redundant information is added to the source data. When the same packet is later decoded, this redundant information is used to correct and/or detect bit errors that occurred during transmission.

Error correction can be improved by increasing the amount of redundant information in a data packet but at the same time net bit rate is reduced. Hence it would be advantageous to use a robust coding scheme for poor radio conditions, and a coding scheme with high net bit rate when radio conditions are good. GPRS provides four different coding schemes, whereas EGPRS provides nine different coding schemes.

Various link adaptation (LA) algorithms are used to select an optimum coding scheme for a particular radio link. In a typical link adaptation method a receiver, typically a mobile terminal, measures channel quality of the used radio link in terms of signal strength, bit error rate, packet error rate or some other measure appropriate for this purpose. A channel quality estimate is then fed into the link adaptation algorithm which makes the decision to change or not to change the current coding scheme by comparing the estimated channel quality with certain threshold values.

Prior art link adaptation techniques are disclosed, for example, in U.S. Pat. No. 5,359,607; U.S. Pat. No. 5,701,294; U.S. Pat. No. 5,862,171; U.S. Pat. No. 6,072,990; U.S. Pat. No. 6,134,220; U.S. Pat. No. 6,385,462; U.S. Pat. No. 6,308,082; U.S. Pat. No. 6,122,293 and WO 023700.

However, there are significant drawbacks with the prior art link adaptation techniques. They all require pre-determined threshold values to compare the estimated channel quality with. Typically these pre-determined threshold values are obtained by measuring the performance of each coding scheme beforehand at various radio conditions. This can be done either by computer simulations or by empirical measurements. In this context computer simulations and empirical measurements are far from idea solutions, however.

Computer simulations contain assumptions e.g. about the radio channel type. By their very nature these assumptions cannot cover all real world situations, thus errors result. For example, in the context of computer simulations TU3idealFH refers to a commonly used type of channel simulation. The symbol "TU" in TU3idealFH refers to Typical Urban. In real world situations radio channel characteristics differ in a city center, in suburban area and in countryside. Yet the same TU3idealFH channel simulation is typically used for all these cases, thus resulting in inaccuracies. Further, the number "3" in TU3idealFH refers to a mobile terminal assumed to move with the speed of 3 km/h in average. Yet, if the base station is located e.g. along a motorway, the assumption again results in inaccuracies. Further, the term "idealFH" in TU3idealFH refers to idealistic frequency hopping, idealistic meaning that there is one interfering mobile terminal on all the timeslots that belong to the hopping sequence. Yet, if traffic load in the network is low, this assumption again results in inaccuracies.

Empirical measurements on the other hand generate results that are specific to the time and place in which the measurements took place. Further, in practice it is difficult to measure the performance of different coding schemes under all the possible various radio conditions.

Thus there is an obvious need for link adaptation which does not require pre-determined threshold values and which can dynamically adapt to current radio conditions.

SUMMARY OF THE INVENTION

The invention concerns an adaptive link adaptation method and system for a packet data enabled mobile telecommunication network. The packet data enabled mobile telecommunication network includes a cell including a base station and one or more mobile terminals. The mobile terminals are linked to the base station by radio links.

The system includes a transmitter for transmitting data packets over one or more radio links. One or more of the radio links have a variable channel quality, i.e. their channel quality varies over time due to radio conditions. Each packet is coded using a given coding scheme out of a group of predetermined coding schemes.

The system further includes storage means for accumulating over a given period of time statistical data. The statistical data includes periodically provided channel quality estimates. The statistical data further includes periodically provided information about which data packets were received successfully and which data packets were received unsuccessfully. The statistical data further includes periodically provided information about the used coding schemes.

The system further includes a link adapter for determining block error rates for one or more coding schemes based on the accumulated statistical data. Each block error rate is determined as a function of coding scheme and channel quality estimate. The link adapter is further arranged to select a coding scheme with best performance for a current data packet to be transmitted over a given radio link with current channel quality based on the determined block error rates.

In an embodiment of the invention the storage means further include a first table including entries indicating the amounts of successfully received data packets and indexed according to the coding schemes and channel quality estimates. In an embodiment of the invention the storage means further include a second table including entries indicating the amounts of unsuccessfully received data packets and indexed according to the coding schemes and channel quality estimates.

In an embodiment of the invention the storage means further include resetting means for resetting a table when one or more entries exceed a given threshold value.

In an embodiment of the invention the system further includes measuring means for measuring channel quality of the radio links during the transferring of data packets over one or more radio links in order to obtain the channel quality estimates to be provided. Channel quality is used to describe the quality of the radio links. Channel quality may be estimated e.g. in terms of signal strength, bit error rate, packet error rate or some other appropriate measure.

In an embodiment of the invention the transmitter is arranged in connection with the base station. In another embodiment of the invention one or more transmitters are arranged in connection with one or more mobile terminals.

In an embodiment of the invention one or more measuring means are arranged in connection with one or more mobile terminals. In another embodiment of the invention the measuring means are arranged in connection with the base station In an embodiment of the invention the link adapter is arranged in connection with the base station. In another embodiment of the invention one or more link adapters are arranged in connection with one or more mobile terminals.

In an embodiment of the invention the storage means are arranged in connection with the base station. In another embodiment of the invention one or more storage means are arranged in connection with one or more mobile terminals.

In an embodiment of the invention the packet data enabled mobile telecommunication network is a GPRS enabled mobile telecommunication network. In another embodiment of the invention the packet data enabled mobile telecommunication network is an EGPRS enabled mobile telecommunication network.

In an embodiment of the invention the data packets are RLC blocks (Radio Link Control-protocol, RLC).

In an embodiment of the invention the system further includes a Packet Control Unit arranged in connection with the base station. The storage means and link adapter are arranged in connection with the Packet Control Unit.

In an embodiment of the invention the data packets are arranged to be transmitted in an unacknowledged data transmission mode. In another embodiment of the invention the data packets are arranged to be transmitted in an acknowledged data transmission mode.

In an embodiment of the invention RLC acknowledgement messages are arranged to provide the obtained channel quality estimates to the storage means.

In an embodiment of the invention given bitmaps included in RLC acknowledgement messages are arranged to provide the information about the successfully/unsuccessfully received data packets to the storage means. The bitmaps specify which RLC blocks have been received successfully/unsuccessfully.

One advantage of the invention is that a coding scheme may be selected without any pre-determined input information. Yet, at the same time the invention makes it possible to select a coding scheme that is on the average the most suitable for current radio conditions. Further, the invention makes it possible to adapt to the radio channel characteristics of a given cell without any input information about network topology, cell topology, mobile speed, traffic characteristics or coding scheme performance. Further, the invention is also applicable in a case in which the channel quality estimate depends on the used coding scheme, as is the case e.g. with EGPRS. Further, the invention is applicable in both acknowledged and unacknowledged data transmission modes. Further, the invention is extremely simple to implement.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings:

FIG. 3 illustrates the tables used to store the accumulated statistical data according to one embodiment of the invention.

DETAILED DESCRIPTION OF THE PREFERRED EMBODIMENTS

Reference will now be made in detail to the embodiments of the invention, examples of which are illustrated in the accompanying drawings.

Figure 1:
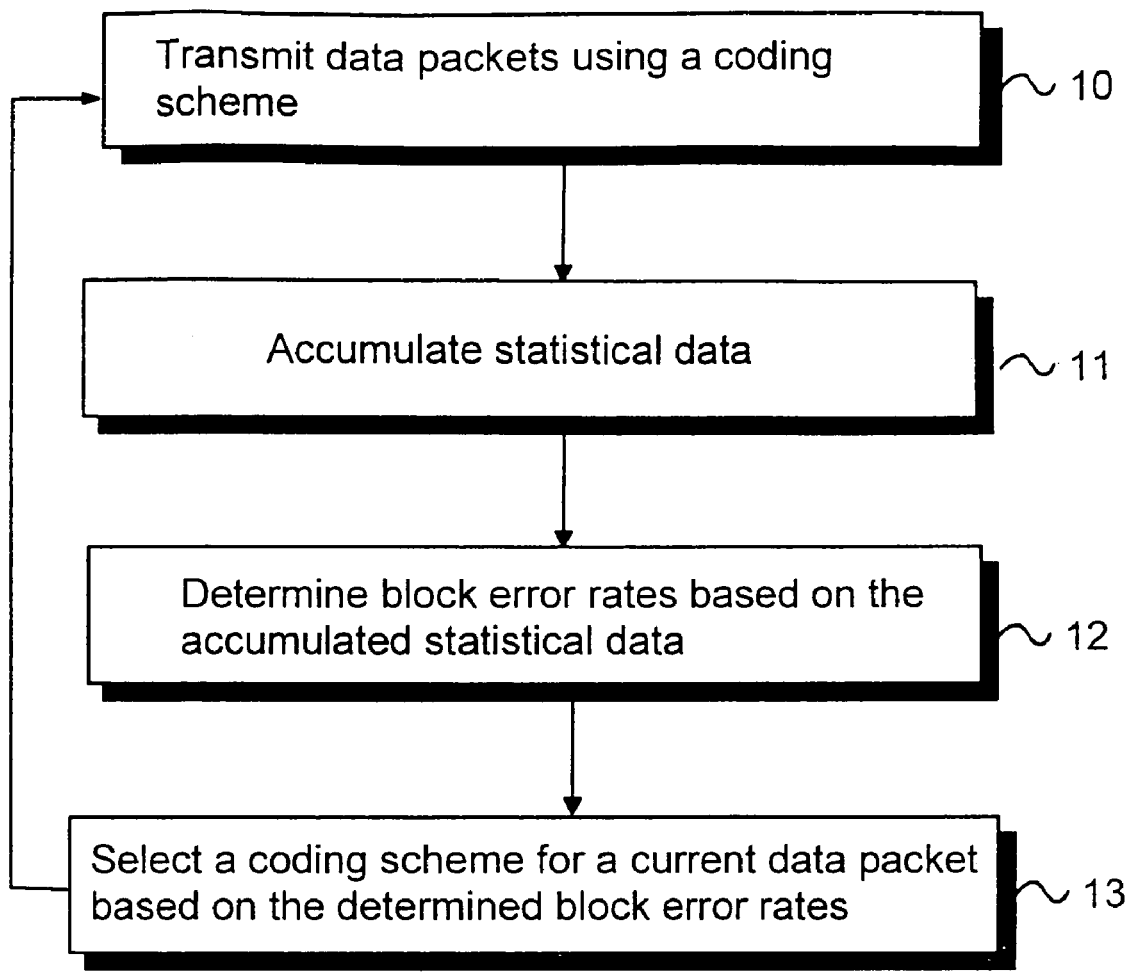
FIG. 1 is a flow chart illustrating an adaptive link adaptation method for a packet data enabled mobile telecommunication network according to one embodiment of the invention.

FIG. 1 illustrates an adaptive link adaptation method for a packet data enabled mobile telecommunication network including a cell including a base station and one or more mobile terminals. The mobile terminals are linked to the base station by radio links of variable channel quality according to one embodiment of the invention.

In the embodiment of the invention illustrated in FIG. 1 data packets are transmitted over one or more radio links, each packet coded using a given coding scheme out of group of predetermined coding schemes, phase 10. Statistical data is accumulated over a given period of time, phase 11. The statistical data includes periodically provided channel quality estimates, periodically provided information about successfully/unsuccessfully received data packets, and periodically provided information about the used coding schemes. In the embodiment of the invention illustrated in FIG. 1 the channel quality estimates to be provided are obtained by measuring the channel quality of the radio links during the transfer of data packets over one or more radio links. Further in the embodiment of the invention illustrated in FIG. 1 two tables are arranged for accumulating the statistical data. A first table includes entries indicating the amounts of successfully received data packets and indexed according to the coding schemes and channel quality estimates. A second table includes entries indicating the amounts of unsuccessfully received data packets and indexed according to the coding schemes and channel quality estimates.

In the embodiment of the invention illustrated in FIG. 1 block error rates are determined for one or more coding schemes based on the accumulated statistical data, phase 12. Each block error rate is determined as a function of coding scheme and channel quality estimate. A coding scheme with best performance for a current data packet to be transmitted over a given radio link with current channel quality is selected based on the determined block error rates, phase 13. Finally, the current data packet is coded using the selected coding scheme and dispatched and loops back to phase 10 as illustrated in the embodiment shown in FIG. 1.

Figure 2:
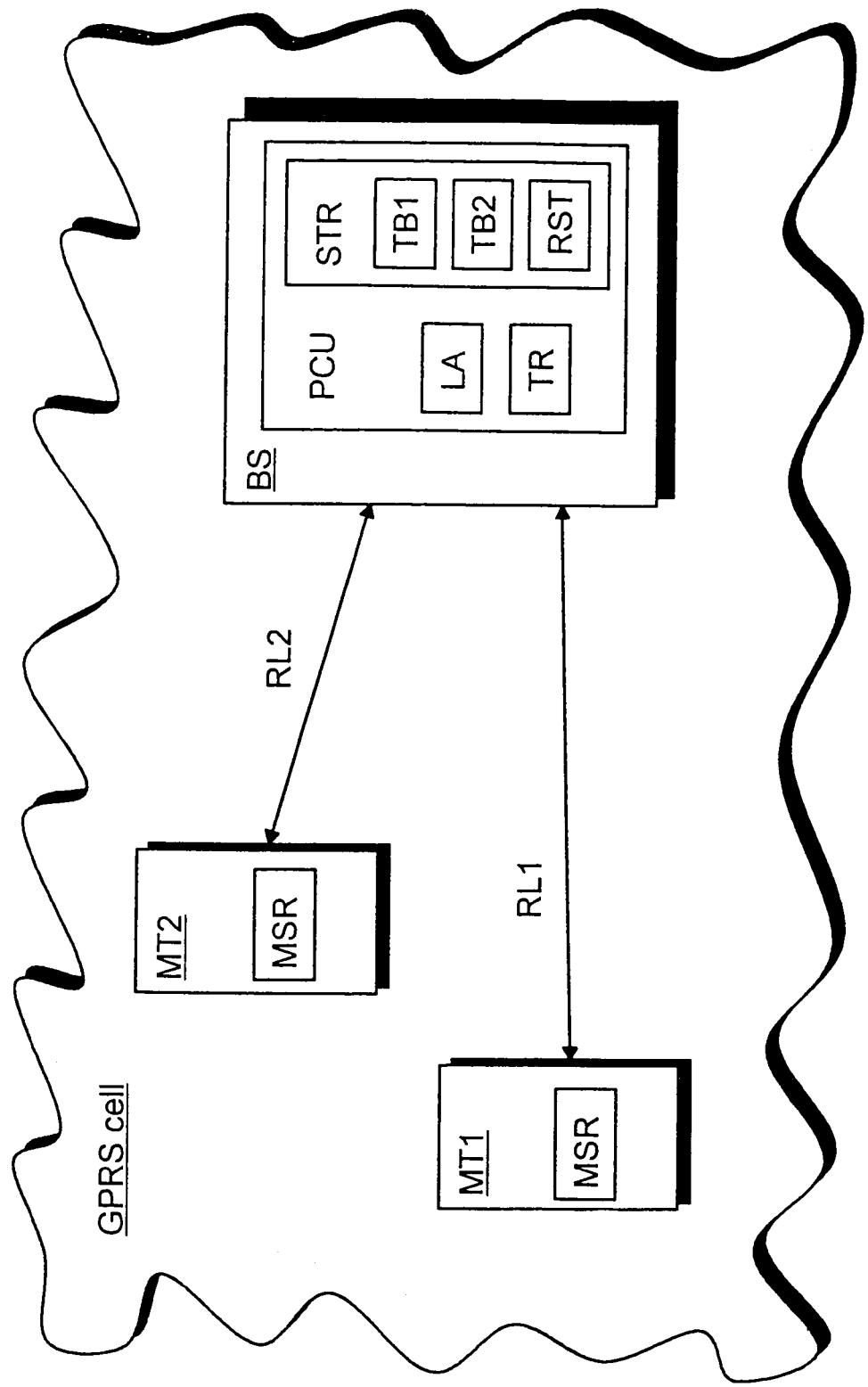
FIG. 2 is a block diagram illustrating an adaptive link adaptation system for a packet data enabled mobile telecommunication network according to one embodiment of the invention.

FIG. 2 illustrates an adaptive link adaptation system for a packet data enabled mobile telecommunication network according to one embodiment of the invention. The packet data enabled mobile telecommunication network may be a GPRS enabled mobile telecommunication network and the data packets may be RLC blocks in the embodiment of the invention illustrated in FIG. 2. The packet data enabled mobile telecommunication network includes a GPRS cell including a base station BS and two mobile terminals MT1 and MT 2. The system further includes a Packet Control Unit PCU arranged in connection with the base station in the embodiment of the invention illustrated in FIG. 2. The mobile terminals are linked to the base station by radio links RL1, RL2 of variable channel quality.

In the embodiment of the invention illustrated in FIG. 2 the system further includes a transmitter TR for transmitting data packets over one or more radio links. Each packet is coded using a given coding scheme out of the four coding schemes provided by GPRS. In the embodiment of the invention illustrated in FIG. 2 the transmitter is arranged in connection with the base station. However, in another embodiment of the invention the transmitters may be arranged in connection with one or more mobile terminals.

In the embodiment of the invention illustrated in FIG. 2 the system further includes storage means STR for accumulating statistical data. The statistical data includes periodically provided channel quality estimates, periodically provided information about successfully/unsuccessfully received data packets, and periodically provided information about the used coding schemes. In the embodiment of the invention illustrated in FIG. 2 the storage means are arranged in connection with the base station. However, in another embodiment of the invention the storage means may be arranged in connection with one or more mobile terminals.

Further in the embodiment of the invention illustrated in FIG. 2 the storage means include a first table TB1 including entries indicating the amounts of successfully received data packets and indexed according to the coding schemes and channel quality estimates.

Further in the embodiment of the invention illustrated in FIG. 2 the storage means include a second table TB2 including entries indicating the amounts of unsuccessfully received data packets and indexed according to the coding schemes and channel quality estimates.

Further in the embodiment of the invention illustrated in FIG. 2 the storage means include resetting means RST for resetting a table when one or more entries exceed a given threshold value.

In the embodiment of the invention illustrated in FIG. 2 the system further includes a link adapter LA for determining block error rates for one or more coding schemes based on the accumulated statistical data, each block error rate a function of coding scheme and channel quality estimate, and for selecting a coding scheme with best performance for a current data packet to be transmitted over a given radio link with current channel quality based on the determined block error rates. In the embodiment of the invention illustrated in FIG. 2 the link adapter is arranged in connection with the base station. However, in another embodiment of the invention the link adapter may be arranged in connection with one or more mobile terminals. Further in the embodiment of the invention illustrated in FIG. 2 the storage means and the link adapter are arranged in connection with the Packet Control Unit.

In the embodiment of the invention illustrated in FIG. 2 the system further includes measuring means MSR for measuring channel quality of the radio links during the transferring of data packets over one or more radio links in order to obtain the channel quality estimates to be provided. In the embodiment of the invention illustrated in FIG. 2 the measuring means are arranged in connection with the mobile terminals. However, in another embodiment of the invention the measuring means may be arranged in connection with the base station.

FIG. 3 illustrates the tables used to store the statistical data according to one embodiment of the invention. Table 1 is used to store entries indicating the amounts of successfully received data packets and indexed according to the coding schemes and channel quality estimates. The columns represent e.g. the four different coding schemes used by GPRS, i.e. CS1, CS2, CS3 and CS4. The rows represent channel quality estimates. In the embodiment of the invention illustrated in FIG. 3 channel quality estimate is presented with three bits, thus there are eight different values for the channel quality estimate, i.e. CQ1, CQ2, CQ3, CQ4, CQ5, CQ6, CQ7 and CQ8. Initially each entry is initialized to e.g. the value of 1 or 0. Each time the base station is provided with statistical data indicating that, e.g. a packet was received successfully using coding scheme CS2 with a corresponding channel quality estimate CQ3, the value of the corresponding entry in Table 1 is increased by 1. In the example of FIG. 3 the value has reached 21.

Correspondingly Table 2 of FIG. 3 is used to store entries indicating the amounts of unsuccessfully received data packets and indexed according to the coding schemes and channel quality estimates. The columns represent e.g. the four different coding schemes used by GPRS, i.e. CS1, CS2, CS3 and CS4. The rows represent channel quality estimates. In the embodiment of the invention illustrated in FIG. 3, the channel quality estimate is presented with three bits. Thus, there are eight different values for the channel quality estimate, i.e. CQ1, CQ2, CQ3, CQ4, CQ5, CQ6, CQ7 and CQ8. Initially each entry is initialized to e.g. the value of 1 or 0. Each time the base station is provided with statistical data indicating that, e.g. a packet was received unsuccessfully using coding scheme CS2 with a corresponding channel quality estimate CQ3, the value of the corresponding entry in Table 1 is increased by 1. In the example of FIG. 3 value has reached 2. Using the Tables 1 and 2 of FIG. 3 it can be determined which coding scheme gives the best performance for current channel quality.

It is obvious to a person skilled in the art that with the advancement of technology, the basic idea of the invention may be implemented in various ways. The invention and its embodiments are thus not limited to the examples described above, instead they may vary within the scope of the claims.

What is claimed is:

1. An adaptive link adaptation method for a packet data enabled mobile telecommunication network, the method comprising:
    transmitting data packets over at least one radio link, at least one packet coded using a given coding scheme selected from a group of at least three predetermined coding schemes, wherein the packet data enabled mobile telecommunication network comprises a cell comprising a base station and at least one mobile terminal, the at least one mobile terminal linked to the base station by radio links, at least one radio link having variable channel quality;
    accumulating statistical data comprising periodically provided channel quality estimates, periodically provided information about amounts of at least one of successfully received data packets and unsuccessfully received data packets, and periodically provided information about the used coding schemes by storing entries indicating the accumulated information about the amounts of the at least one of the successfully received data packets and the unsuccessfully received data packets and the entries indexed according to the coding schemes and channel quality estimates;
    determining block error rates for at least one coding scheme based on the accumulated statistical data, at least one block error rate comprising a function of coding scheme and channel quality estimate; and
    selecting, from the group of the at least three predetermined coding schemes, a coding scheme with a best performance for a current data packet to be transmitted over a given radio link with a current channel quality based on the determined block error rates.

2. The method according to claim 1, wherein said accumulating further comprises
    arranging two tables, a first table comprising entries indicating the amount of successfully received data packets and indexed according to the coding schemes and channel quality estimates, and a second table comprising entries indicating the amount of unsuccessfully received data packets and indexed according to the coding schemes and channel quality estimates.

3. The method according to claim 2, further comprising resetting a table when at least one entry exceeds a given threshold value.

4. The method according to claim 1, further comprising obtaining the channel quality estimates by measuring channel quality of said radio links during said transferring of data packets over at least one radio link.

5. The method according to claim 1, further comprising providing the packet data enabled mobile telecommunication network to comprise a general packet radio service enabled mobile telecommunication network.

6. The method according to claim 5, further comprising providing the data packets comprising radio link control blocks.

7. The method according to claim 6, further comprising transmitting the data packets in an unacknowledged mode.

8. The method according to claim 6, further comprising transmitting the data packets in an acknowledged mode.

9. The method according to claim 8, further comprising providing the information about the successfully received data packets and the unsuccessfully received data packets by using given bitmaps comprised in radio link control acknowledgement messages, said bitmaps specifying which radio link control blocks have been received successfully or unsuccessfully.

10. The method according to claim 8, further comprising providing the channel quality estimates by using radio link control acknowledgement messages.

11. The method according to claim 1, further comprising configuring the packet data enabled mobile telecommunication network to comprise an edge general packet radio service enabled mobile telecommunication network.

12. An adaptive link adaptation system for a packet data enabled mobile telecommunication network, the system comprising:
    a transmitter configured to transmit data packets over at least one radio link, at least one packet coded using a given coding scheme selected from a group of at least three predetermined coding schemes, wherein the packet data enabled mobile telecommunication network comprises a cell comprising a base station and at least one mobile terminal, the at least one mobile terminal linked to the base station by radio links, at least one radio link having variable channel quality;
    a storage unit configured to accumulate statistical data comprising periodically provided channel quality estimates, periodically provided information about amounts of at least one of successfully received data packets and unsuccessfully received data packets, and periodically provided information about the used coding schemes by storing entries indicating the accumulated information about the amounts of the at least one of the successfully received data packets and the unsuccessfully received data packets and the entries indexed according to the coding schemes and channel quality estimates; and
    a link adapter configured to determine block error rates for at least one coding scheme based on the accumulated statistical data, at least one block error rate comprising a function of coding scheme and channel quality estimate, and to select, from the group of the at least three predetermined coding schemes, a coding scheme with a best performance for a current data packet to be transmitted over a given radio link with a current channel quality based on the determined block error rates.

13. The system according to claim 12, wherein the storage unit comprises:
    a first table comprising entries indicating the amount of successfully received data packets and indexed according to the coding schemes and channel quality estimates; and a second table comprising entries indicating the amount of unsuccessfully received data packets and indexed according to the coding schemes and channel quality estimates.

14. The system according to claim 13, wherein the storage unit further comprises:
a resetting unit configured to reset a table when at least one entry exceeds a given threshold value.

15. The system according to claim 12, further comprising:
a measuring unit configured to measure a channel quality of said radio links during said transferring of data packets over the at least one radio link in order to obtain the channel quality estimates to be provided.

16. The system according to claim 15, wherein the measuring unit is configured in connection with at least one mobile terminal.

17. The system according to claim 15, wherein the measuring unit is configured in connection with a base station.

18. The system according to claim 12, wherein the transmitter is configured in connection with a base station.

19. The system according to claim 12, wherein the transmitter is configured in connection with at least one mobile terminal.

20. The system according to claim 12, wherein the link adapter is configured in connection with a base station.

21. The system according to claim 12, wherein the link adapter is configured in connection with at least one mobile terminal.

22. The system according to claim 12, wherein the storage unit is configured in connection with a base station.

23. The system according to claim 12, wherein the storage unit is configured in connection with at least one mobile terminal.

24. The system according to claim 12, wherein the packet data enabled mobile telecommunication network is a general packet radio service enabled mobile telecommunication network.

25. The system according to claim 24, wherein the data packets are radio link control blocks.

26. The system according to claim 25, wherein the system further comprises:
a packet control unit arranged in connection with a base station, said storage unit and a link adapter configured in connection with said packet control unit.

27. The system according to claim 25, wherein the data packets are configured to be transmitted in an unacknowledged mode.

28. The system according to claim 25, wherein the data packets are configured to be transmitted in an acknowledged mode.

29. The system according to claim 28, wherein radio link control acknowledgement messages are configured to provide the obtained channel quality estimates to the storage unit.

30. The system according to claim 28, wherein given bitmaps comprised in radio link control acknowledgement messages are configured to provide the information about the successfully received data packets and the unsuccessfully received data packets to the storage unit, said bitmaps specifying which radio link control blocks have been received successfully or unsuccessfully.

31. The system according to claim 12, wherein the packet data enabled mobile telecommunication network is an edge general packet service enabled mobile telecommunication network.

32. An adaptive link adaptation system for a packet data enabled mobile telecommunication network, the system comprising:
transmitter means for transmitting data packets over at least one radio link, at least one packet coded using a given coding scheme selected from a group of at least three predetermined coding schemes, wherein the packet data enabled mobile telecommunication network comprises a cell comprising a base station and at least one mobile terminal, the at least one mobile terminal linked to the base station by radio links, at least one radio link having variable channel quality;
storage means for accumulating statistical data comprising periodically provided channel quality estimates, periodically provided information about amounts of at least one of successfully received data packets and unsuccessfully received data packets, and periodically provided information about the used coding schemes by storing entries indicating the accumulated information about the amounts of the at least one of the successfully received data packets and the unsuccessfully received data packets and the entries indexed according to the coding schemes and channel quality estimates; and link adapter means for determining block error rates for at least one coding scheme based on the accumulated statistical data, at least one block error rate comprising a function of coding scheme and channel quality estimate, and for selecting, from the group of the at least three predetermined coding schemes, a coding scheme with a best performance for a current data packet to be transmitted over a given radio link with a current channel quality based on the determined block error rates.

* * * * *